(12) United States Patent
Morrell

(10) Patent No.: US 12,091,154 B2
(45) Date of Patent: Sep. 17, 2024

(54) PIN JOINT ASSEMBLY

(71) Applicant: AIRBUS OPERATIONS LIMITED, Bristol (GB)

(72) Inventor: Paul Morrell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 325 days.

(21) Appl. No.: 17/575,096

(22) Filed: Jan. 13, 2022

(65) Prior Publication Data

US 2022/0227473 A1    Jul. 21, 2022

(30) Foreign Application Priority Data

Jan. 15, 2021  (GB) ...................... 2100577

(51) Int. Cl.
    *F16C 11/04*    (2006.01)
    *B64C 1/26*     (2006.01)
    *B64C 9/02*     (2006.01)

(52) U.S. Cl.
    CPC ............... *B64C 1/26* (2013.01); *F16C 11/04* (2013.01); *F16C 11/045* (2013.01); *B64C 9/02* (2013.01); *Y10T 403/32868* (2015.01); *Y10T 403/32909* (2015.01)

(58) Field of Classification Search
    CPC ........... F16C 11/045; Y10T 403/32868; Y10T 403/32909; B64C 9/02
    See application file for complete search history.

(56) References Cited

U.S. PATENT DOCUMENTS

| 4,607,977 A | 8/1986 | Varnelis et al. |
| 10,731,699 B2 * | 8/2020 | Renaud ................... E02F 9/006 |
| 2017/0152886 A1 | 6/2017 | Renaud et al. |
| 2019/0308739 A1 * | 10/2019 | Messina ................. F16C 11/10 |

FOREIGN PATENT DOCUMENTS

| EP | 0 603 840 | 6/1994 | |
| EP | 2 586 700 | 5/2013 | |
| FR | 3 099 4 63 | * 8/2019 | ............ B64D 27/26 |
| JP | 3198163 | 6/2015 | |

OTHER PUBLICATIONS

Combined Search and Examination Report for GB Application No. 2100577.2 dated Jun. 4, 2021, 7 pages.
Extended European Search Report for Application No. 22150568.8, eight pages, dated May 16, 2022.

* cited by examiner

*Primary Examiner* — Michael P Ferguson
(74) *Attorney, Agent, or Firm* — Nixon & Vanderhye P.C.

(57) ABSTRACT

A pin joint assembly is disclosed having a first lug and a second lug, a pin extending through the first and second lugs, a U-shaped bushing between the first lug and the pin, wherein the U-shaped bushing includes a first end flange and a second end flange that extend radially outwards and retain the U-shaped bushing to the first lug, and wherein the U-shaped bushing includes a bearing surface between the first and second end flanges on which the first lug is slidable.

17 Claims, 10 Drawing Sheets

PIN JOINT ASSEMBLY

CROSS RELATED APPLICATION

This application claims priority to United Kingdom Patent Application GB 2100577.2, filed Jan. 15, 2021, the entire contents of which is hereby incorporated by reference.

FIELD OF THE INVENTION

The present invention relates to a pin joint assembly, an aircraft assembly comprising the pin joint assembly, and an aircraft comprising the aircraft assembly.

BACKGROUND OF THE INVENTION

The internal space available for components and systems within an aircraft is typically restricted, particularly in the wings where structural and aerodynamic considerations are paramount.

Pin joints are often required within wing structures, for example to actuate control surfaces or folding wing tip mechanisms. A pin joint typically requires various bushing arrangements to reduce the friction between respective rotating surfaces, however the design of these bushing arrangements can dictate the positioning of the pin joint due to the restricted space within the aircraft structure. This can have a knock-on effect to the choice and positioning of other adjacent components within the aircraft structure.

SUMMARY OF THE INVENTION

A first aspect of the invention provides a pin joint assembly, comprising: a first lug and a second lug; a pin extending through the first and second lugs; a U-shaped bushing between the first lug and the pin, wherein the U-shaped bushing comprises a first end flange and a second end flange that extend radially outwards and retain the U-shaped bushing to the first lug; wherein the U-shaped bushing comprises a bearing surface between the first and second end flanges on which the first lug is slidable.

The float provided to a pin joint assembly may be relatively large for ease of assembly and then subsequently require reduction prior to operation of the pin joint. With the arrangement of the present invention, the U-shaped bushing is able to reduce the amount of float provided to a pin joint assembly, whilst allowing movement of the second bushing, as well as being positionable on any of the lugs of the pin joint.

Preferably, the pin comprises a head end, a tail end, and a body portion between the head end and tail end, wherein the head end has a diameter greater than a diameter of the body portion.

Preferably, the U-shaped bushing is adjacent the head end of the pin. The U-shaped bushing can be particularly advantageous in combination with a headed pin, as the U-shaped bushing can be placed anywhere along the length of the pin, including adjacent the head end.

Preferably, the U-shaped bushing bears against the second lug. With this arrangement, relative movement between the U-shaped bushing and the second lug can be prevented.

Preferably, the pin assembly comprises a first bushing between the first lug and the pin and/or a second bushing between the second lug and the U-shaped bushing.

Preferably, the first bushing is a fixed bushing fixedly attached to the first lug and/or the second bushing is a fixed bushing fixedly attached to the second lug.

Preferably, the U-shaped bushing is a two-part bushing comprising: a first bushing component having a first body portion and a first flanged portion extending from the first body portion; a second bushing component having a second body portion and a second flanged portion extending from the second body portion; wherein the first body portion is arranged to overlap the second body portion to fasten the first and second bushing components together.

With this arrangement, the second bushing is easier to position on the bearing surface of the U-shaped bushing.

Preferably, the first body portion overlaps the second flanged portion and terminates substantially flush with an outer-most face of the second flanged portion.

With this arrangement, the join between the first and second bushing components is not at the inner bearing surface of the U-shaped bushing.

Preferably, the outer-most face of the second flanged portion is arranged adjacent the head end of the pin.

With this arrangement, the join between the first and second bushing components is not adjacent to a lug or bushing. This can be particularly advantageous when the relative rotation between U-shaped bushing and the second lug is expected to be greater than the relative rotation between the U-shaped bushing and the pin.

Preferably, the first body portion and second body portion are fastened together via an interference fit.

Preferably, the first body portion or second body portion comprises a protrusion, and the other of the first body portion or second body portion comprises a depression sized to correspond to the protrusion; and wherein the first and second bushing components are fastened together by lodging the protrusion into the depression.

Preferably, the U-shaped bushing is rotatable with respect to the pin. This provides a dual-slip path, thereby providing a redundant slip path in the event that a slip path becomes damaged or otherwise unusable.

A second aspect of the invention provides an aircraft assembly comprising the pin joint assembly of any preceding claim, a first aircraft component, and a second aircraft component, wherein the first end lug extends from one of the first or second aircraft components and the second lug extends from one of the first or second aircraft components, such that the first aircraft component is arranged to rotate relative to the second aircraft component about an axis of the pin joint assembly.

Preferably, the first aircraft component is a main wing portion of a wing and the second aircraft component is a wing tip device.

Preferably, the first aircraft component is a main wing portion of a wing and the second aircraft component is a flight control surface.

Preferably, the flight control surface is one of: an aileron, a slat, a spoiler, and a flap.

Preferably, the aircraft assembly further comprises an obstruction arranged at an obstructed end of the pin hole.

Preferably, the obstruction is an actuator for rotating the second aircraft component relative to the first aircraft component.

Preferably, the head end of the pin is arranged adjacent the obstruction. With this arrangement, the tail end and associated locking features may be positioned on an opposite end of the pin assembly, away from the obstruction, thereby providing additional space for the obstruction. This can be useful when the obstruction is, e.g., an actuator for actuating the first aircraft component and second aircraft component about the axis of the pin joint assembly. The obstruction may be positioned in a better position, or allow a bigger obstruction (e.g. actuator) to be installed, or even more room for maintenance.

Preferably, the pin joint assembly is a first pin joint assembly, and the aircraft assembly further comprises a second pin joint assembly, wherein the obstruction is arranged at the obstructed end of the first pin joint assembly and at an obstructed end of the second pin joint assembly.

Preferably, the head end of the pin of the second pin joint assembly is arranged adjacent the obstruction.

Preferably, the first aircraft component and/or second aircraft component comprises an outer shell, and wherein a clearance distance between the pin and the outer shell in a direction parallel to an axis of the pin varies along the pin. The pin assembly can be particularly advantageous in an aircraft assembly with an outer shell (e.g. an aerodynamic shell) that causes the clearance distance between the pin assembly and outer shell to vary, as the U-shaped bushing is suitable for positioning anywhere along the pin, such that the increased stack height caused by the U-shaped bushing can be positioned where there is most clearance room.

A third aspect of the invention provides an aircraft comprising the aircraft assembly of the second aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
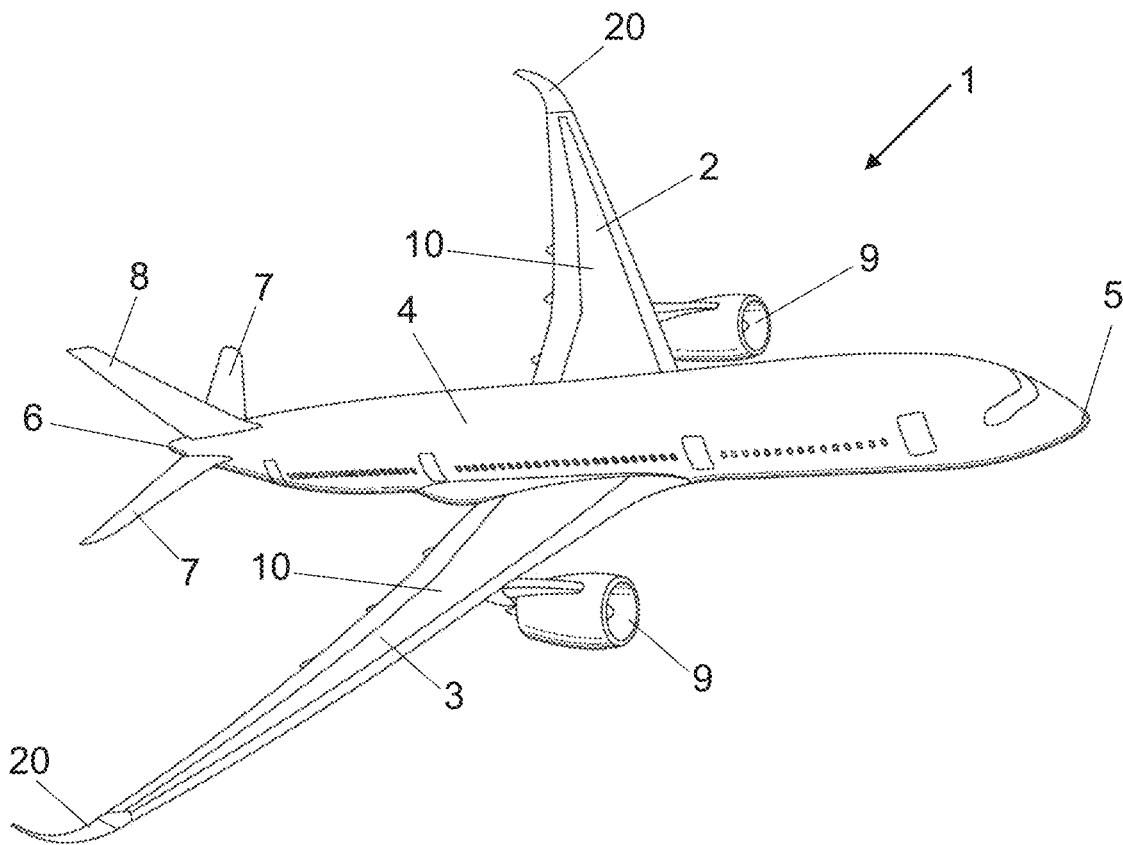
FIG. 1 shows a perspective view of a typical fixed wing aircraft.

FIG. 1 illustrates a typical fixed wing aircraft 1. The aircraft 1 may have a port wing 2 and a starboard wing 3 that extend from a fuselage 4. Each wing 2, 3 may carry wing mounted engines 9. The fuselage 4 has a nose 5 and a tail 6. The tail 6 may have horizontal and vertical stabiliser surfaces 7, 8. The aircraft 1 may be a typical jet passenger transport aircraft although the invention is applicable to a wide variety of fixed wing aircraft types, including commercial, military, passenger, cargo, jet, propeller, general aviation, etc. with any number of engines attached to the wings or fuselage.

Each wing 2, 3 of the aircraft 1 may have a main wing portion 10 that is a cantilevered structure with a length extending in a span-wise direction from a wing root to a wing tip, the root being joined to the aircraft fuselage 4. A wing tip device 20 may be provided on the tip end of each wing 2, 3. The wings 2, 3 are similar in construction so only the starboard wing 3 will be described in detail with reference to FIG. 2.

Figure 2:
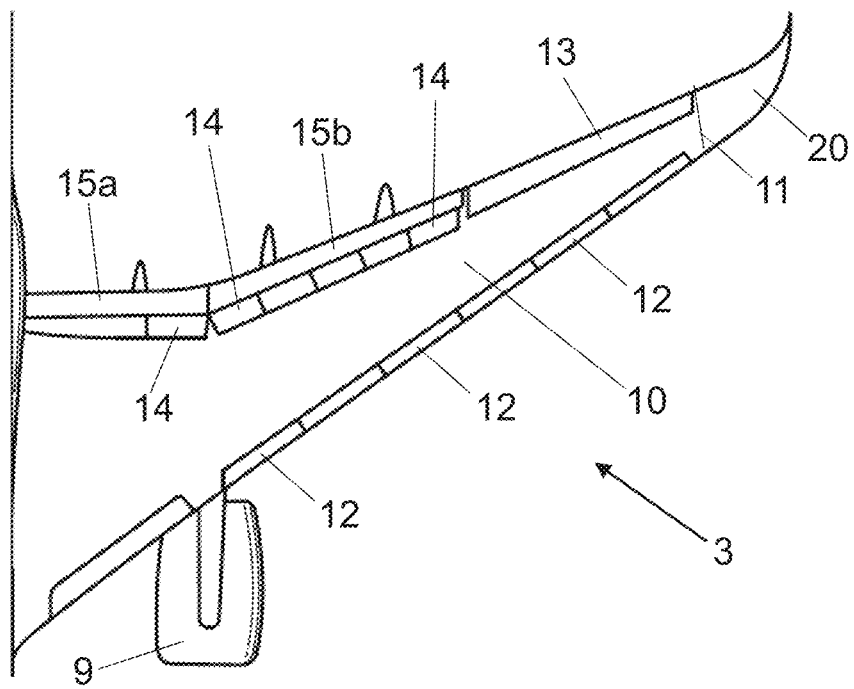
FIG. 2 shows a planform view of a port side wing.

The wing 3 may have a plurality of flight control surfaces. The wing 3 may include slats 12. FIG. 2 shows slats 12 adjacent to the leading edge of the wing 3. A plurality of slats 12 may be distributed along the span of the wing 3. The wing 3 may include an aileron 13. FIG. 2 shows an aileron 13 provided on an outboard section of the trailing edge of the wing 3. The wing 3 may include air brakes/spoilers 14. FIG. 2 shows air brakes/spoilers 14 provided across the upper surface of the wing 3 towards the trailing edge of the wing 3. The wing 3 may include a flap 15. FIG. 2 shows an inner flap 15a adjacent to the wing root, and an outer flap 15b outboard of the inner flap towards the aileron 13.

Whilst the aircraft 1 is shown with a particular quantity and configuration of control surfaces, it will be understood that the wings 2, 3 may comprise a different number and/or arrangement of control surfaces.

The wing tip device 20 may be a folding wing tip device 20 configured to rotate relative to the wing 3 about a fold axis 11. The fold axis 11 may extend from a leading edge to a trailing edge of the wing 3. The folding wing tip device 20 may be rotated relative to the wing 3 by an actuator 50.

Figure 3:
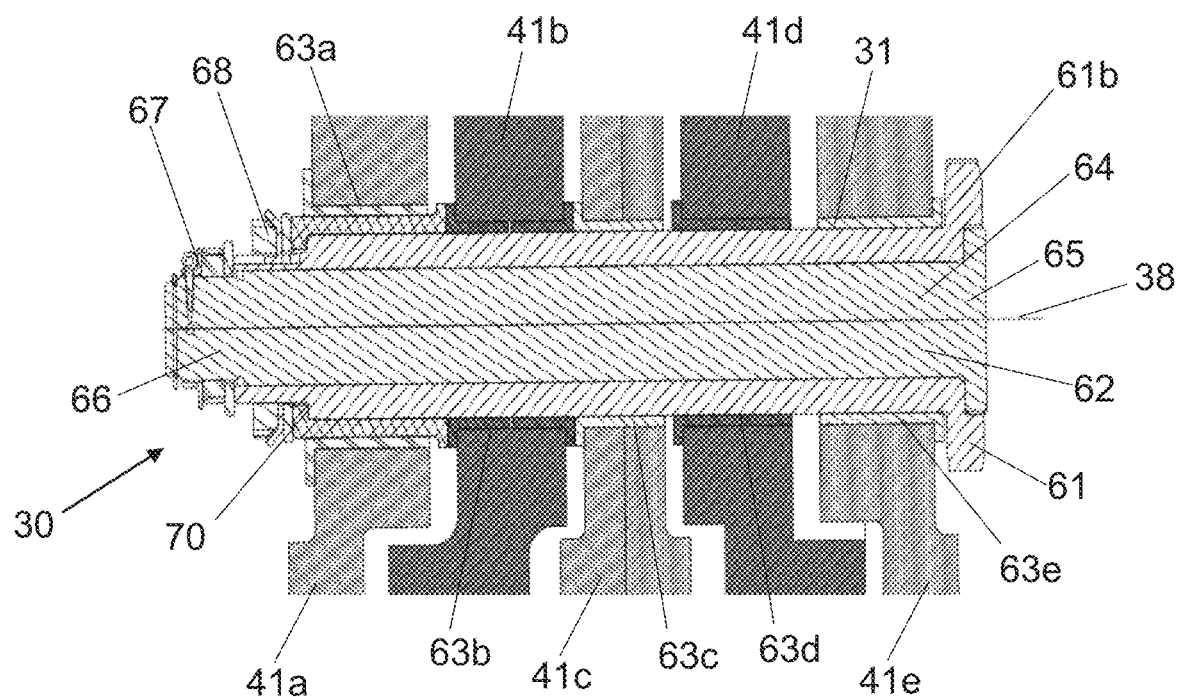
FIG. 3 shows a pin joint assembly of the prior art.

FIG. 3 shows an existing folding wing tip mechanism according to an example of the prior art. The mechanism includes a pin joint assembly 30.

The pin joint assembly 30 includes a first set of lugs, first lug 41a, third lug 41c, and fifth lug 41e extending from the tip end of the wing 3 and a second set of lugs, second lug 41b, and fourth lug 41d, extending from a root end of the wing tip device 20. The first and fifth lugs 41a, 41e are end lugs positioned at opposing ends of the pin joint assembly 30. The lugs 41a-e may be aluminium lugs.

The lugs 41a, 41b, 41c, 41d, 41e include a pin hole 31 extending therethrough, and through which a headed pin 62 is inserted. The headed pin 62 may be a steel pin. The headed pin 62 is inserted into a pin sleeve 61. A set of bushings, first bushing 63a, second bushing 63b, third bushing 63c, fourth bushing 63d and fifth bushing 63e, are arranged between the pin sleeve 61 and each lug 41a, 42a, 43a, 43b to reduce the friction between the relative parts when the wing tip device 20 folds relative to the wing 3, and for example to protect the relatively soft aluminium of the lugs 41a-e from the steel pin 62 or pin sleeve 61. The bushings 63a-e may be fixed bushings, fixedly attached to each of the respective lugs 41a-e.

The bushings 63a-e may be integral with their respective lugs 41a-e. For example, if the lugs 41a-e and pin 62 are made of the same material, such as steel. Alternatively, any of the bushings 63a-e may be rotatable with respect to their respective lugs 43a-e.

The headed pin 62 has a head end 65 and a tail end 66. The head end 65 has a diameter larger than the pin hole 31 and headed pin 62, such that the headed pin 62 is prevented from being fully inserted into the pin hole 31. The tail end 66 includes a set of locking features 67 (for example locking nuts) that tighten towards the head end 65, thereby pressing the headed pin 62 against the pin sleeve 61. FIG. 3 shows the headed pin 62 pressing against the end bushings 63a, 63e of the end wing lugs 41a, 41e, although alternatively the end lugs may be wing tip lugs.

Figure 4:
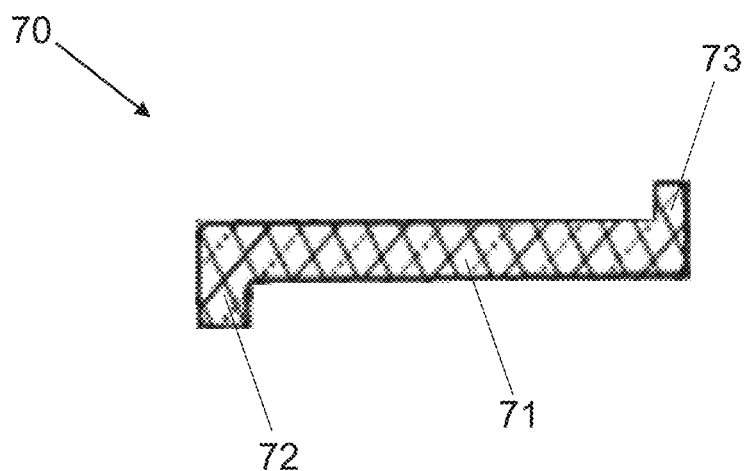
FIG. 4 shows a z-shaped bushing of the prior art.

The end bushing 63a adjacent the tail end 66 is located on the bearing surface 71 of a substantially z-shaped bushing 70, for example as shown in cross-section in FIG. 4. The z-shaped bushing 70 comprises a first end flange 72 that is an inwardly extending flange, such that the flange extends towards an axis of the bushing 63a, and a second end flange 73 that is an outwardly extending flange, such that the flange extends away from the axis of the bushing 63a. The bearing surface 71 is defined as being between the first and second end flanges 72, 73, on which the fixed bushing 63a of the end lug 41a is positioned.

Figure 5:
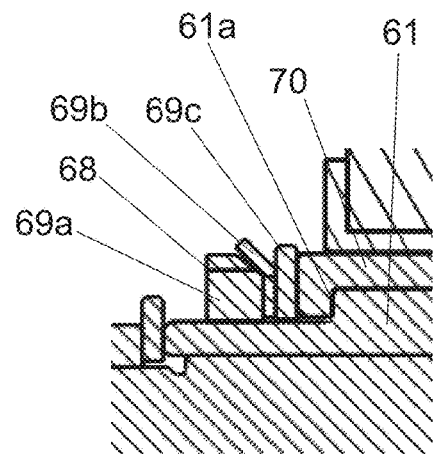
FIG. 5 shows a close-up view of the pin joint assembly of FIG. 3.

As shown in FIG. 3, and in an expanded view shown in FIG. 5, the z-shaped end bushing 70 is clamped to a shoulder 61a of the pin sleeve 61 by a set of locking features 68. Specifically, the inwardly extending end flange 72 is clamped to the pin sleeve 61.

The locking features 68 may comprise one or more of a locking ring 69a, tab washer 69b or thrust washer 69c.

The z-shaped bushing 70 has a length greater than the length of the fixed bushing 63a in a direction parallel to the axis 38 of the pin 62, such that the z-shaped bushing 70 reduces the gap to the fixed bushing 63b of the adjacent lug 41b of the wing tip device 20 whilst allowing the fixed bushing 63a on its bearing surface 71 to move along the bearing surface 71.

Consequently, the axial movement of the first set of lugs 41a, 41c, 41e with respect to the second set of lugs 41b, 41d is limited by the addition of the z-shaped bushing 70, as the axial movement of the second set of lugs 41b, 41d is prevented in one direction by the z-shaped bushing 70 and in the opposite direction by the third lug 41c. This third lug 41c is itself limited in its axial movement towards the head end 65, as the third lug 41c is connected to the first (end) lug 41a and fifth (end) lug 41e via the structure of the wing 3, and the axial movement of the third lug 41c is thereby restricted by the fifth lug 41e contacting the head end 65 or by the first lug 41a contacting the outwardly extending end flange 73 of the z-shaped bushing 70.

The movement prior to the installation of the z-shaped bushing 70 may be 3 mm, 5 mm, or more so as to provide additional clearance (i.e. float) for assembling the wing 3 to the wing tip device 20. Installation of the z-shaped bushing 70 reduces this float to a value that is acceptable in the assembled state for actuation of the pin joint, for example, the float may be 1 mm or less after assembly of the z-shaped bushing 70.

There may be limited space within a structure to house the pin joint assembly 3, for example due to the aerodynamic profile of the airframe or wing structure 80 in which the mechanism may be housed.

Figure 6:
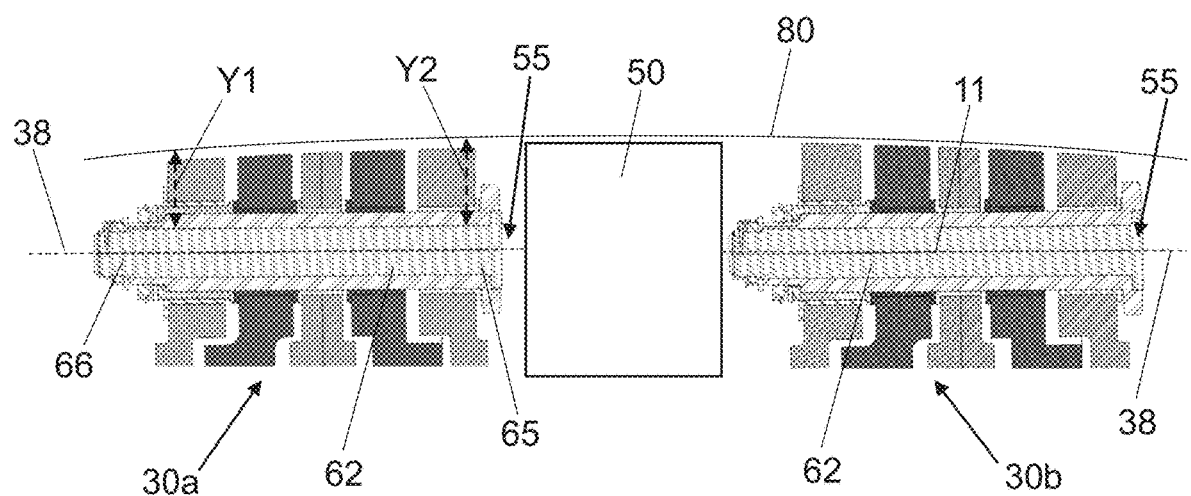
FIG. 6 shows an aircraft assembly including a pair of pin joint assemblies of the prior art.

FIG. 6 schematically shows an actuator 50 positioned between a pair of pin assemblies 30: a first pin joint assembly 30a adjacent a leading edge of the wing 3 and a second pin joint assembly 30b adjacent the trailing edge of the wing 3. The axes 38 of the headed pins 62 of each assembly 30a, 30b are aligned with each other to define a hinge axis of the folding assembly, for example a hinge axis 11 of the wing 3 and wing tip device 20.

Due to the limited space within the wing structure 80, the actuator 50 fills a substantial amount of the space between the two pin joint assemblies 30a, 30b, such that the first and second pin joint assemblies 30a, 30b need to be housed close to the leading edge and trailing edge of the wing 3, respectively.

As a result, the vertical clearance distance between the pin 62 and the wing structure 80 (e.g. the outer shell of the wing box) in a direction parallel to the axis 38 of the pin 62 varies along the length of the pin 62. For example, FIG. 6 shows the vertical clearance distance Y1 of the first pin joint assembly 30a and the wing structure 80 at a first end of the pin 62 adjacent the tail end 66 is smaller than the vertical clearance distance Y2 of the first pin joint assembly 30a and the wing structure 80 at a second end of the pin 62 adjacent the head end 65. This may be due to the aerodynamic profiling of the wing structure 80. This can limit the possible arrangement and orientation of the first and second pin joint assemblies 30a, 30b.

In FIG. 6, the first pin joint assembly 30a is oriented with the tail end 66 facing towards the leading edge and the head end 65 facing towards the trailing edge. This provides additional space for the actuator 50 positioned between the first and second pin joint assemblies 30a, 30b, as the locking features 67 of the pin joint assembly 30a take up a large amount of axial space (with respect to the axial space taken by the arrangement at the head end).

In contrast, there is limited vertical clearance towards the trailing edge of the wing structure 80. Due to the increased stack height resulting from use of the z-shaped bushing 70 (i.e. the combined height of the z-shaped bushing 70 and the fixed bushing 63a), which is positioned against the tail end 66 of the pin 62, it is not possible to position the tail end 66 towards the trailing edge. As a result, the tail end 66 is positioned so as to face the leading edge, and thereby occupies space between the two pin joint assemblies 30a, 30b. This limits the size and position of the actuator 50.

Figure 7:
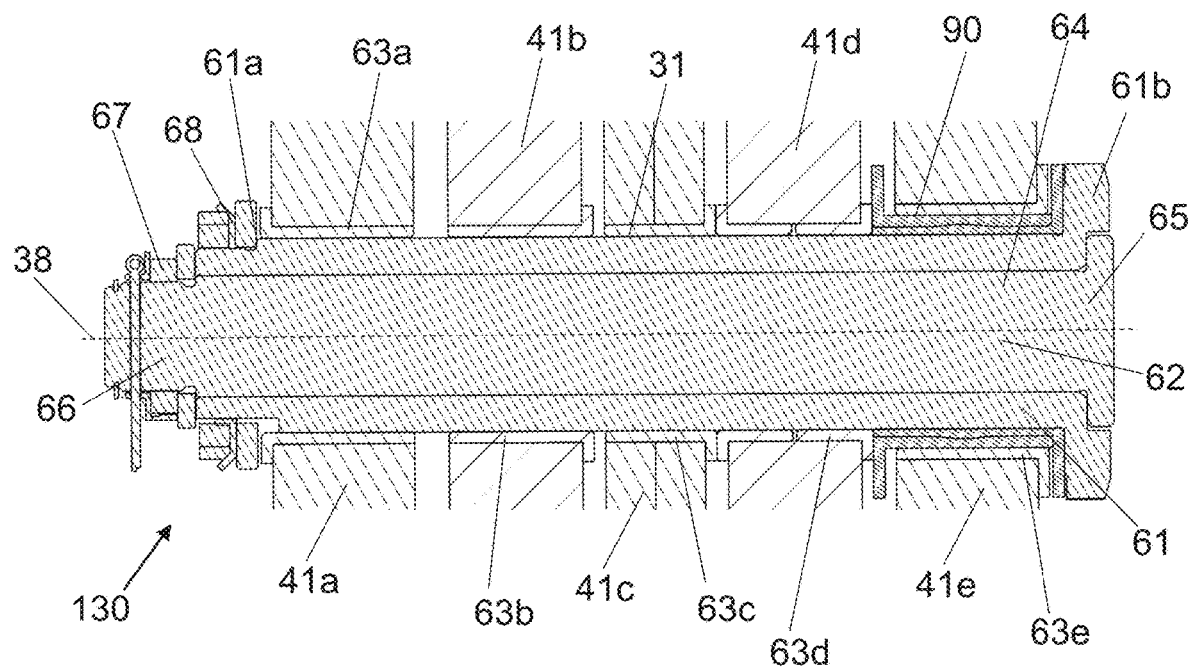
FIG. 7 shows an example of a pin joint assembly of the present invention.

FIG. 7 shows an example of a pin joint assembly 130 according to the present invention. The pin assembly 130 of the present example is substantially similar to the examples of the pin assemblies 30, 30a, 30b described in relation to FIGS. 3 to 6, with like numerals used to denote like parts. The pin joint assembly 130 may be used in a folding wing tip mechanism, as described in relation to FIG. 3, or any other type of hinge assembly, for example a pin joint assembly between a wing 3 and an aileron, slat, spoiler, flap or other control surface.

The pin joint assembly 130 comprises a U-shaped bushing 90 having features that allow it to be positioned against a lug, for example any of the lugs 41a, 41b, 41c, 41d, 41e shown in FIG. 7, such that the U-shaped bushing 90 may be positioned on a lug 41a, 42a, 43a, 43b adjacent the head end 65 or tail end 66 of a pin 62, or anywhere in between, as will be made clear below.

The pin joint assembly 130 may include a set of lugs, first lug 41a, third lug 41c, and fifth lug 41e extending from a first structure (for example the tip end of a wing 3) and a set of lugs, second lug 41b, and fourth lug 41d, extending from a second structure (for example the root end of a wing tip device 20). The first and fifth lugs 41a, 41e may be end lugs positioned at opposing ends of the pin joint assembly 130, as shown in FIG. 7.

The lugs 41a, 41b, 41c, 41d, 41e include a pin hole 31 extending therethrough, and through which a headed pin 62 may be inserted. The headed pin 62 may be inserted into a pin sleeve 61. A set of bushings 63a, 63b, 63c, 63d, 63e, 90 may be arranged between the pin sleeve 61 and each lug 41a, 42a, 43a, 43b to reduce the friction between the relative parts when the first structure 20 folds relative to the second structure 3, with two of the bushings 63e, 90 stacked on top of each other, as will be explained below.

The headed pin 62 has a head end 65 and a tail end 66, and a pin body 64 between the head end 65 and the tail end 66. The head end 65 may have a diameter larger than the pin hole 31 and headed pin 62, such that the headed pin 62 is prevented from being fully inserted into the pin hole 31. The head end 65 may be integral with the pin body 64, or separate to the pin body 64 such that the head end 65 may be attachable and/or detachable from the pin body 64.

The tail end 66 may include a set of locking features 67 (for example locking nuts) that tighten towards the pin sleeve 61, thereby pressing the headed pin 62 against the pin sleeve 61. FIG. 7 shows a pair of wing tip lugs 41b, 41d positioned between three wing lugs 41a, 41c, 41e, although any number and arrangement of lugs 41a-e may be provided.

The U-shaped bushing 90 adjacent the head end 65 of the pin 62 comprises end flanges 92a, 92b arranged to extend outwardly from a central axis of the U-shaped bushing 90, and an outer bearing surface 95a between the flanges 92a,b. The U-shaped bushing 90 may be positioned adjacent the head end 65 of the pin, with the bushing 63e of the end lug 41e located between the flanges 92a,b and slidable along the outer bearing surface 95a, as shown in FIG. 7. The U-shaped bushing 90 may be rotatable with respect to the pin 62 via an inner bearing surface 95b (See FIG. 12A).

Figure 8:
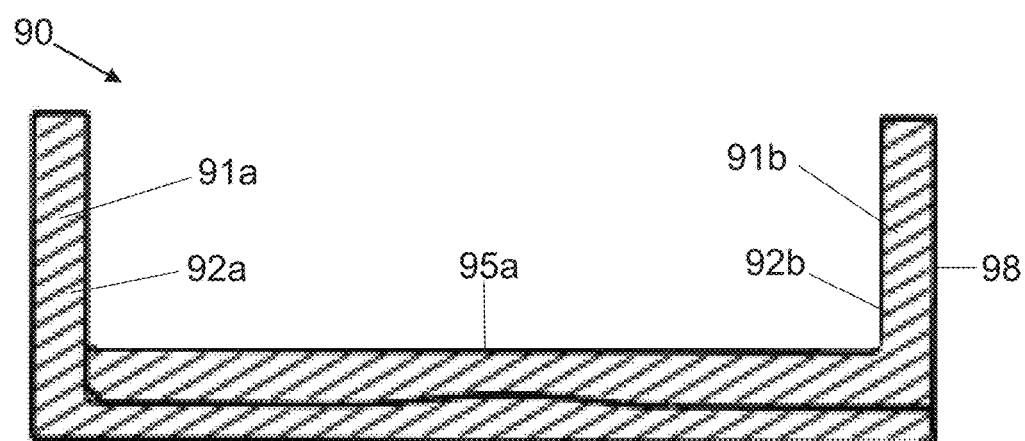
FIG. 8 shows a U-shaped bushing according to an example of the present invention.
Figure 9A:
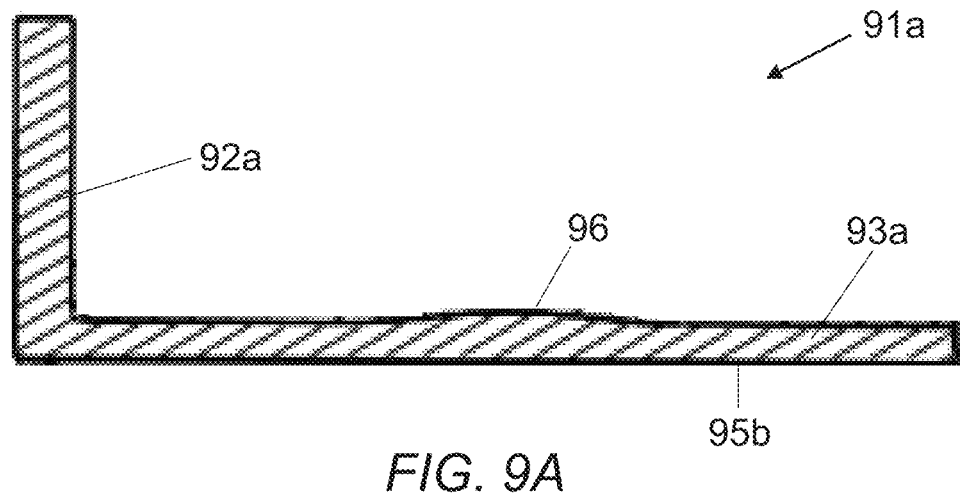
FIG. 9A shows a first bushing component of the U-shaped bushing of FIG. 8.
Figure 9B:
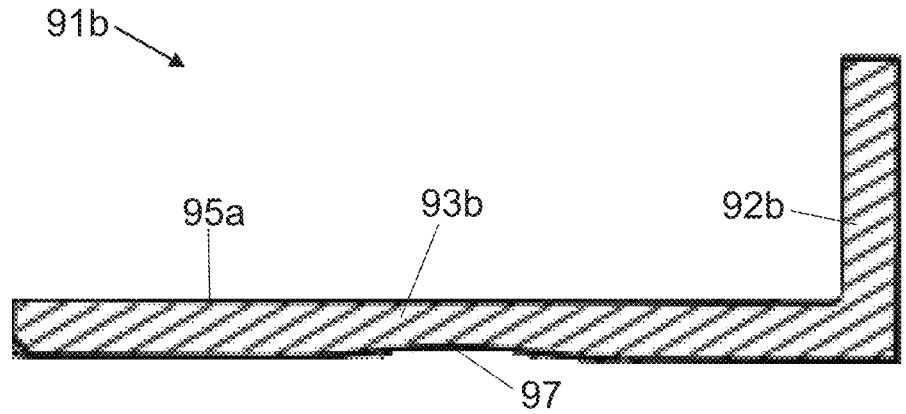
FIG. 9B shows a second bushing component of the U-shaped bushing of FIG. 8.

An example of a U-shaped bushing 90 is described in more detail in relation to FIGS. 8, 9A, and 9B.

The U-shaped bushing 90 may be a two-part bushing, for example as shown in FIG. 8.

The U-shaped bushing 90 may include a first bushing component 91a having a first body portion 93a and a first flanged portion 92a extending from the first body portion 93a. The first flanged portion 92a may extend substantially perpendicular from the first body portion 93a.

The U-shaped bushing 90 may include a second bushing component 91b having a second body portion 93b and a second flanged portion 92b extending from the second body portion 93b. The second flanged portion 92b may extend substantially perpendicular from the second body portion 93b.

The first body portion 93a may comprise a protrusion 96. The second body portion 93b may comprise a depression 97 sized to correspond to the protrusion 96. The protrusion 96 and depression 97 may be arranged such that the protrusion 96 is lodged in the depression 97, thereby fastening the first and second bushing components 91a,b together when the first body portion 91a overlaps the second body portion 91b. This prevents the first and second bushing components 91a, 91b from being separated easily.

In an alternative example, the first body portion 93a may comprise a depression 97 and the second body portion 93b may comprise a protrusion 96.

The height of the protrusion 96 and depth of the depression 97 may be partially dictated by the thickness of the first and second body portions 93a,b, for example the height of the protrusion 96 and depth of the depression 97 may be approximately half of the thickness of the first or second body portions 93a, 93b.

The protrusion 96 and depression 97 may have a smoothly curved cross-section when viewed in a direction perpendicular to the axis of the bushing 90. The cross-section may be continuously circular or ovalised, and may smoothly taper towards the body portion 93a, 93b.

The first body portion 93a may overlap the second flanged portion 92b and terminate substantially flush with an outermost face 98 of the second flanged portion 92b, for example as shown in FIG. 8. This provides a join between the first and second bushing components 91a,b adjacent a side of the bushing 90, i.e. away from the inner bearing surface 95b.

The first body portion 93a and second body portion 93b may be fastened together via an interference fit, such that the overlapping faces of the first and second body portions 93a,b may be held together by friction. The interference fit may be formed by freeze-fitting or shrink-fitting, wherein the relative size of one of the first or second body portions 93a,b is changed under temperature prior to assembly such that a return to room temperature forces the portions 93a,b tightly together.

Figure 10:
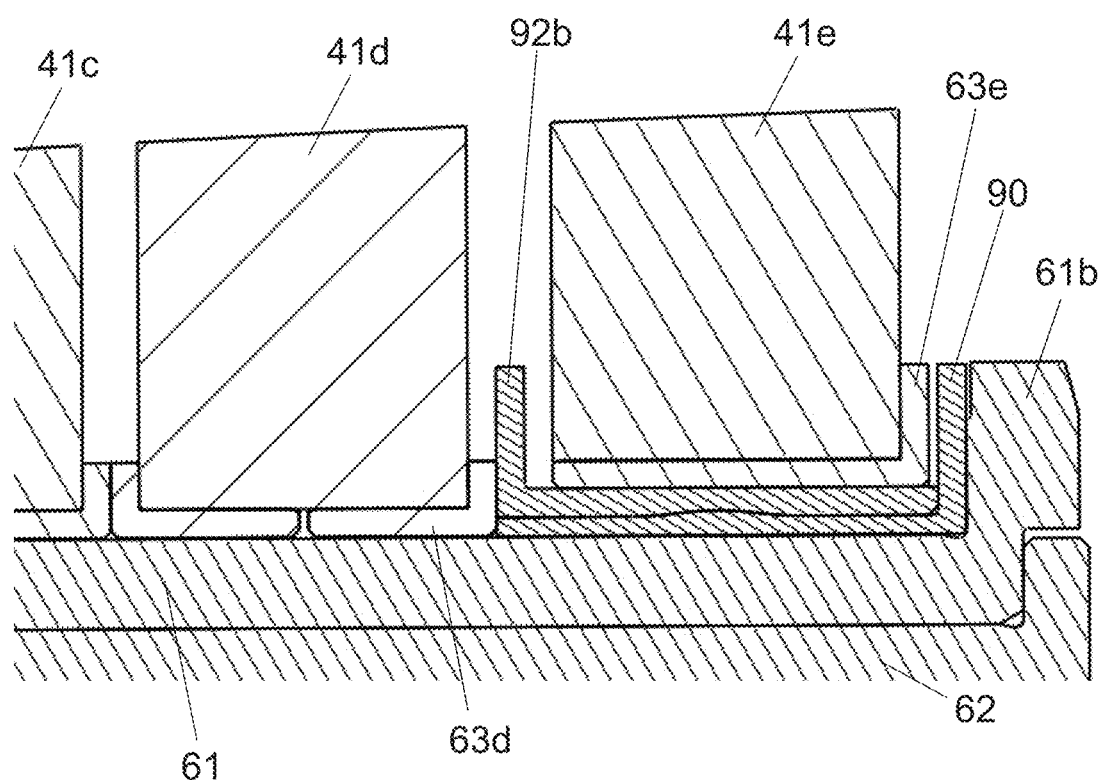
FIG. 10 shows a close-up view of the pin joint assembly of FIG. 7.

The outer bearing surface 95a of the U-shaped bushing 90 has a length greater than a length of the bushing 63e located between the flanges 92a,b, for example as shown in FIG. 10, such that the bushing 63e may slide along the outer bearing surface 95a. The bushing 63e may slide by a distance defined by the difference between the length of the bearing surface 95a and the length of the bushing 63e. The length of the bushing 63e may correspond substantially to the contact distance of the bushing 63e with the bearing surface 95a in a direction parallel to the axis of the U-shaped bushing 90.

FIG. 10 shows an example in which the outer-most face 98 of the second flanged portion 92b is arranged adjacent the bushing 63d of the fourth lug 41d. In an alternative example, it may be preferable to position the outer-most face 98 of the second flanged portion 92b adjacent the head end 65 of the pin 62 due to the increased relative rotation expected between the first and second sets of lugs 41a-e.

The bushing 63e is slidable along the outer bearing surface 95a with respect to the outer bearing surface 95a in a direction parallel to the axis 38 of the pin 62. The bushing 63e of the lug 41e may be a fixed bushing fixedly attached to the lug 41e. The bushing 63e may be integral with the lug 41e. Alternatively, the bushing 63e may be rotatable with respect to the lug 43e.

The movement of the bushing 63e along a direction parallel to the axis 38 of the pin 62, with respect to the outer bearing surface 95a, is limited by the flanges 92a,b on either end of the outer bearing surface 95a.

Each of the bushings 63a-d, 90 positioned against the pin sleeve 61 is moveable along the direction of the pin axis 38 with respect to the pin sleeve 61, such that relative movement is provided between the set of lugs 41a, 41c, 41e extending from the tip end of the wing 3 and the set of lugs 41b, 41d extending from the root end of the wing tip device 20.

The set of lugs 41a,c,e extending from a first structure (for example the tip end of a wing 3) are fixedly attached to each other such that each of the lugs 41a,c,e are fixed in position relative to each of the other lugs 41a,c,e. Similarly, the set of lugs 41b,d extending from a second structure (for example the root end of a wing tip device 20) are fixedly attached to each other such that each of the lugs 41b,d are fixed in position relative to each of the other lugs 41b,d.

Figure 11:
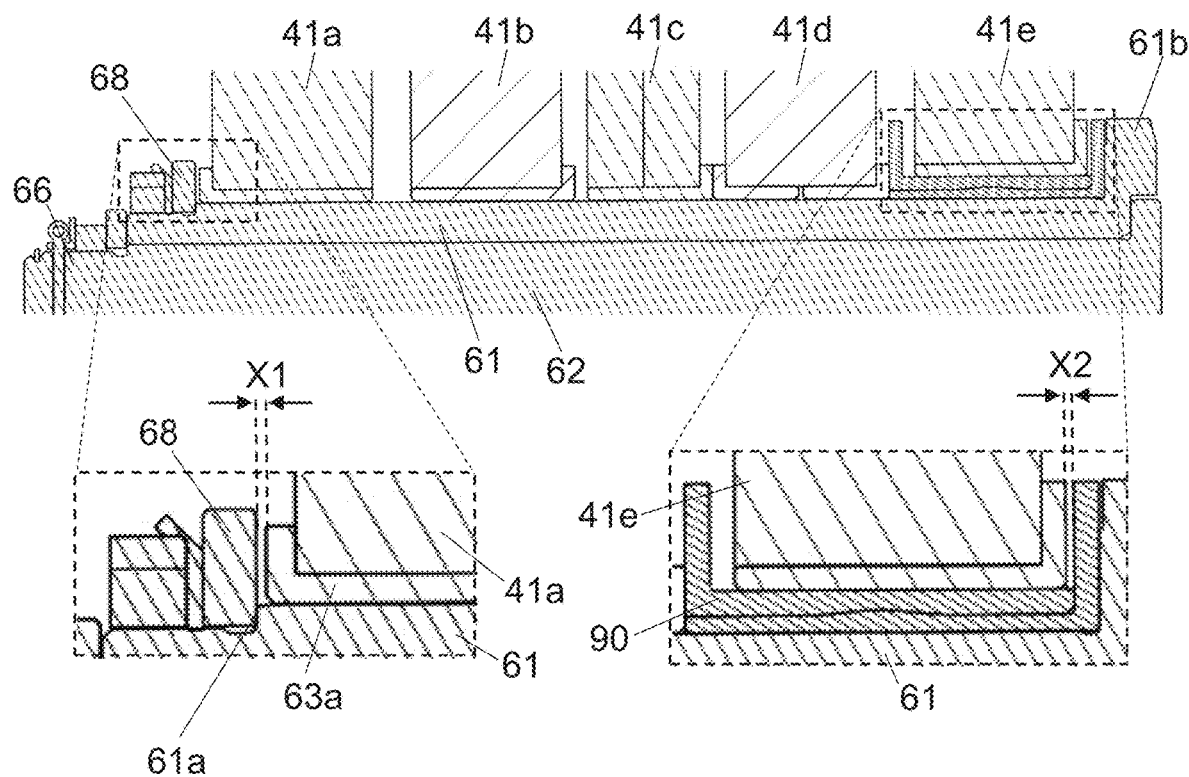
FIG. 11 shows the pin joint assembly in a first, rear-most, position.

FIG. 11 shows the pin joint assembly 130 in a first, rear-most, position in which the first set of lugs 41a,c,e are positioned towards the head end 65 of the pin 62, as close to the head end 65 of the pin 62 as the arrangement will allow in this example.

In this configuration, a gap X1 is provided between the fixed bushing 63a of the first lug 41a and the locking features 68 that clamp against the shoulder 61*a* of the pin sleeve 61. The gap X1 is prevented from increasing in size, as the third lug 41*c* bears against the fourth lug 41*d*, which bears against the U-shaped bushing 90, which itself bears against the shoulder 61*b* of the pin sleeve 61. Gap X2 between the fifth bushing 63*e* of the fifth lug 41*e* is therefore prevented from decreasing in size.

Figure 12:
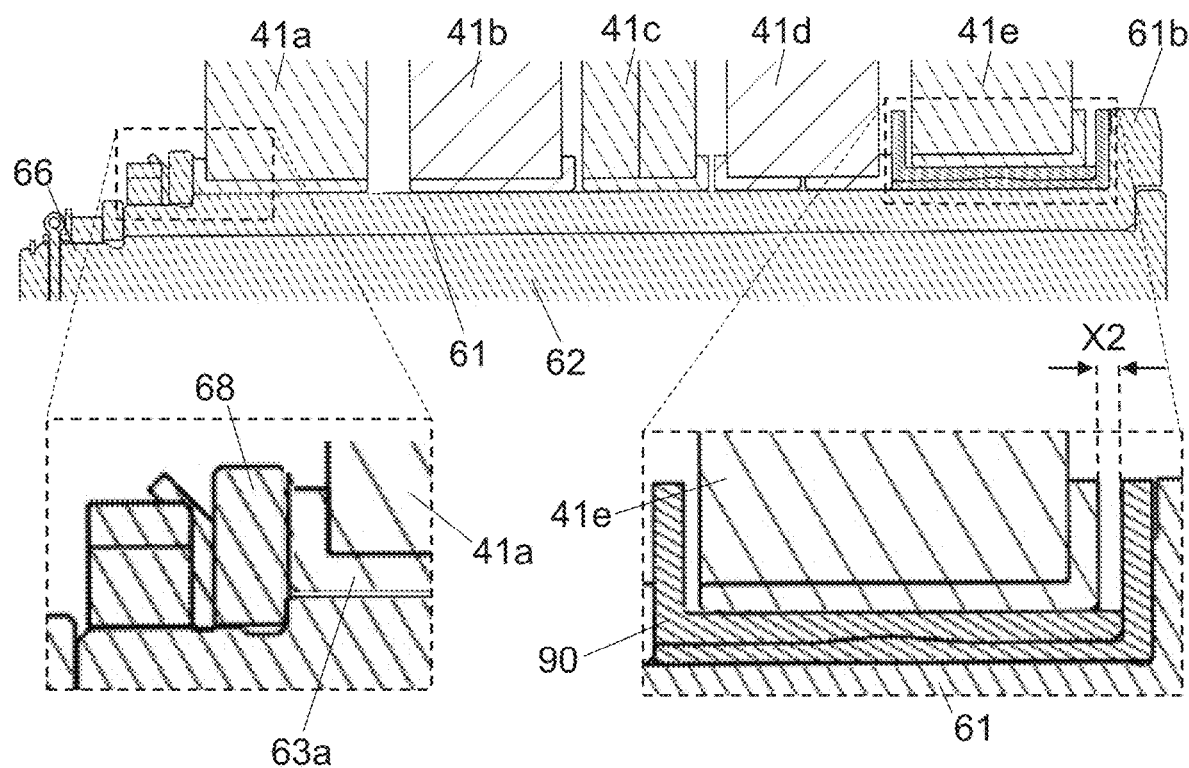
FIG. 12 shows the pin joint assembly in a second, forward-most, position.

FIG. 12 shows the pin joint assembly 130 in a second, forward-most, position in which the first set of lugs 41*a,c,e* are positioned towards the tail end 66 of the pin 62, such that there is no gap (i.e. gap X1 has closed up) between the fixed bushing 63*a* of the first lug 41*a* and the locking features 68 that clamp against the shoulder 61*a* of the pin sleeve 61, as the first lug 41*a* has moved forward towards the tail end 66 of the pin 62.

As the first lug 41*a* is connected to the third and fifth lugs 41*c*, 41*e*, via the first structure 3, the third and fifth lugs 41*c*, 41*e* move forward towards the tail end 66 of the pin 62 with the first lug 41*a*. The gap X2 has therefore increased in size. The increase in size of X2 corresponds to the decrease in size of X1 with respect to the arrangement shown in FIG. 11.

The gap X1 therefore defines an allowable amount of float between the first set of lugs 41*a,c,e* and the second set of lugs 41*b,d*. The float allows relative fore and aft movement between the first set of lugs 41*a,c,e*, the second set of lugs 41*b,d*, and the pin 61. The float may be 2 mm, 1 mm, or 0.5 mm, although the amount of float will typically depend on the size of the pin joint assembly and the particular application.

The first set of lugs 41*a,c,e*, second set of lugs 41*b,d*, and pin sleeve 61 (and pin 62 attached to the pin sleeve 61) are moveable relative to each other, i.e. the first set of lugs 41*a,c,e* are movable with respect to the second set of lugs 41*b,d*, the first set of lugs 41*a,c,e*, are moveable with respect to the pin sleeve 61, and the second set of lugs 41*b,d* are movable with respect to the pin sleeve 61. Each of the bushings 63*a-e*, 90 of the pin joint assembly 130 is unclamped, such that they are rotatable with respect to the pin 62 and pin sleeve 61.

The U-shaped bushing 90 reduces the amount of float without having to modify the width of the lugs, and unlike the z-shaped bushing 70 described in relation to FIGS. 3 to 6, the U-shaped bushing 90 of the present invention does not need to be clamped to the pin sleeve 61. This may allow a dual slip-path between the end lug 40*e* of the U-shaped bushing 90 and the pin sleeve 61 (and pin 62), thereby providing a reserve slip-path in the event that one of the slip-paths is damaged or otherwise unusable.

As the U-shaped bushing 90 does not need to be clamped, it will be apparent that the U-shaped bushing 90 is suitable for positioning under any of the fixed bushings 63*a-e* of the lugs 41*a-e*, not just the fifth bushing 63*e* or the fifth lug 41*e*.

This allows more design freedom in the arrangement of the pin joint assembly 130, which can have beneficial knock-on effects to other features and systems.

Figure 13:
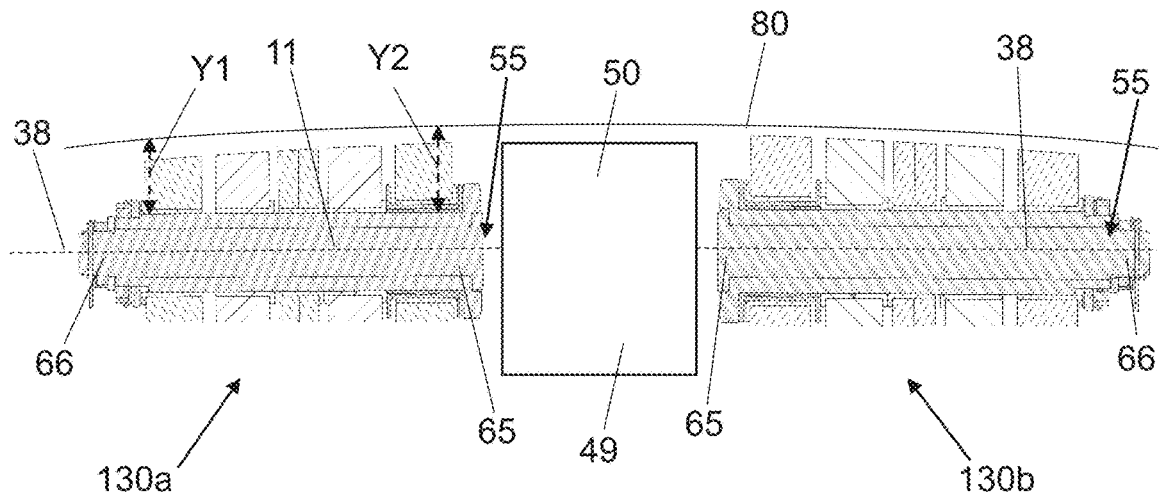
FIG. 13 shows an aircraft assembly including a pair of pin joint assemblies according to the present invention.
Figure 14:
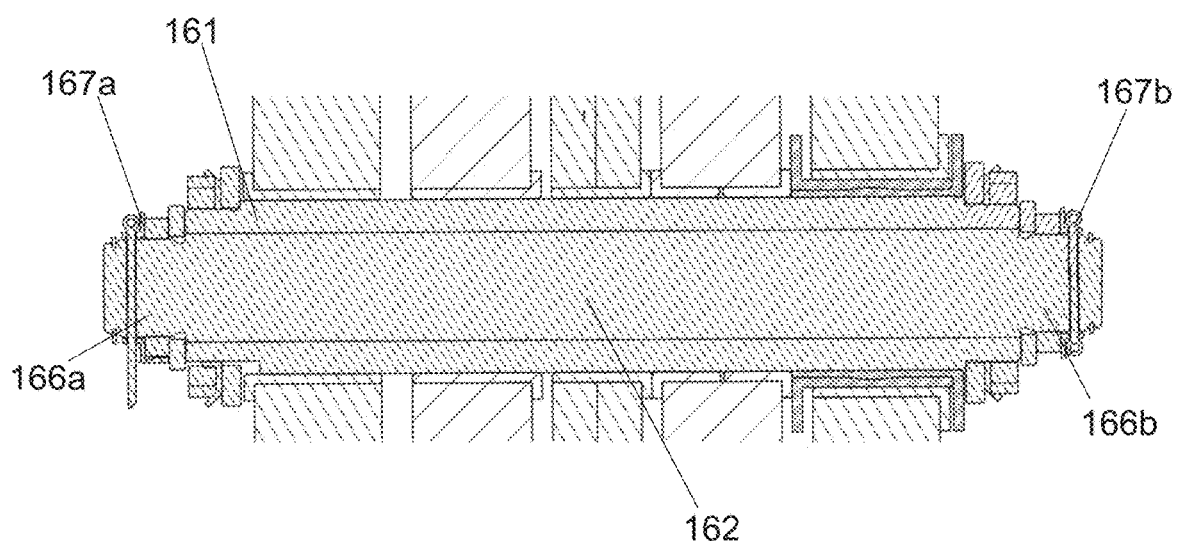
FIG. 14 shows an example of a pin joint assembly comprising a headless pin.

FIG. 13 schematically shows an obstruction 49 positioned between a pair of pin assemblies 130: a first pin joint assembly 130*a* adjacent a leading edge of the wing 3 and a second pin joint assembly 130*b* adjacent the trailing edge of the wing 3. The obstruction may be an actuator 50. The axes 38 of the pins 62 of each pin assembly 130*a*, 130*b* are aligned with each other to define a hinge axis of the folding assembly, for example a hinge axis 11 of the wing 3 and wing tip device 20.

The vertical clearance distance Y1 of the first pin joint assembly 130*a* and the wing structure 80 at a first end of the pin 62 adjacent the tail end 66 is smaller than the vertical clearance distance Y2 of the first pin joint assembly 130*a* and the wing structure 80 at a second end of the pin 62 adjacent the head end 65. This may be due to the aerodynamic profiling of the wing structure 80, for example the wing structure 80 may be aerofoil shaped.

The position of the U-shaped bushing 90 is not dictated by the position of the tail end 66 of the pin 62, in contrast to the z-shaped bushing 70, and so can be positioned adjacent the head end 65 of the pin 62, as shown in FIG. 13. This allows the second pin joint assembly 130*b* to be reversed, with respect to the arrangement shown in FIG. 6, so that the head end 65 is positionable towards the middle of the structure. This increases the available space for fitting and positioning the actuator 50 between the pin joint assemblies 130*a*, 130*b*.

The pin 62 described in relation to FIGS. 7 to 13 is shown to have a head end 65 and a tail end 66, wherein the head end 65 has a diameter larger than the pin hole 31 and headed pin 62, such that the headed pin 62 is prevented from being fully inserted into the pin hole 31. However, it will be appreciated that in alternative examples a headless pin 162 may be provided, in which the headless pin 162 includes a first tail end 166*a* with a corresponding set of locking features 167*a* (for example locking nuts) and a second tail end 166*b* with a corresponding set of locking features 167*b* (for example locking nuts), wherein the locking features of the first tail end 166*a* tighten towards the second tail end 166*b* and the locking features of the second tail end 166*b* tighten towards the first tail end 166*a*, thereby clamping the headed pin 162 against the pin sleeve 161.

The pin joint assemblies 130, 130*a*, 130*b* described in relation to FIGS. 7 to 14 are part of a folding wing tip mechanism, between a wing 2,3 and a wing tip device 20. In alternative examples, a pin joint assembly 230 may be part of a flight control surface mechanism, for example between a wing 2,3 and one of a slat 12, aileron 13, spoiler 14, flap 15 or other control surface.

Figure 15A:
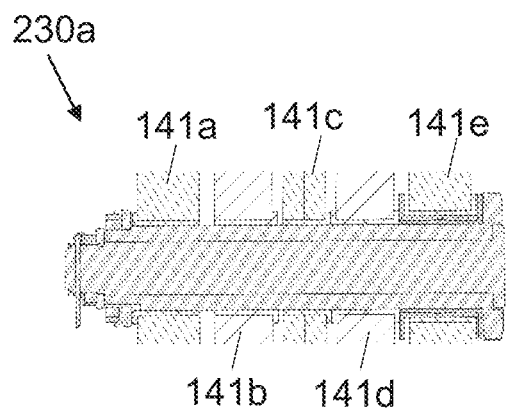
FIG. 15A shows a pin joint assembly between a wing and a slat.

FIG. 15A shows a pin joint assembly 230*a* comprising a first set of lugs 141*a,c,e* extending from a wing 2 and a second set of lugs 141*b,d* extending from a slat 12.

Figure 15B:
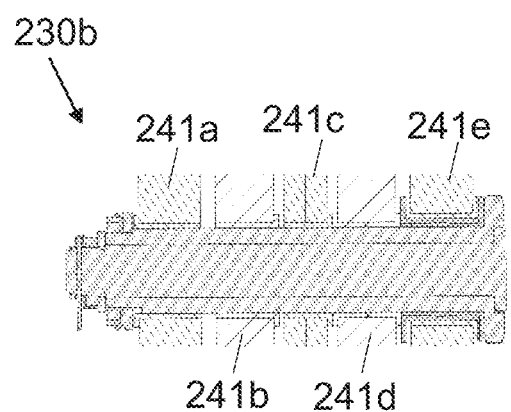
FIG. 15B shows a pin joint assembly between a wing and an aileron.

FIG. 15B shows a pin joint assembly 230*b* comprising a first set of lugs 241*a,c,e* extending from a wing 2 and a second set of lugs 241*b,d* extending from an aileron 13.

Figure 15C:
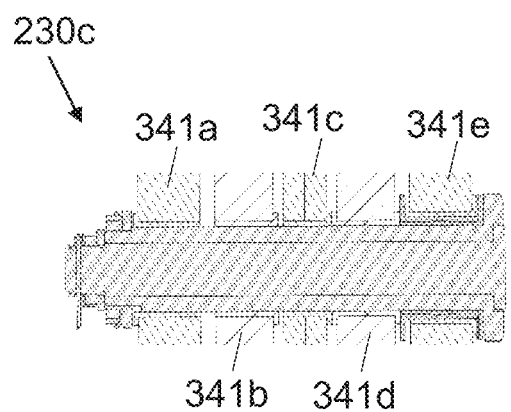
FIG. 15C shows a pin joint assembly between a wing and a spoiler.

FIG. 15C shows a pin joint assembly 230*c* comprising a first set of lugs 341*a,c,e* extending from a wing 2 and a second set of lugs 341*b,d* extending from a spoiler 14.

Figure 15D:
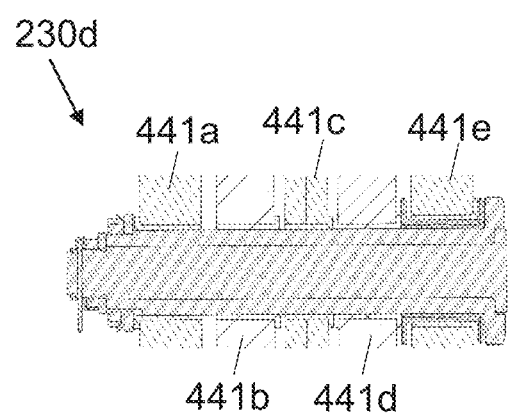
FIG. 15D shows a pin joint assembly between a wing and a flap.

FIG. 15D shows a pin joint assembly 230*d* comprising a first set of lugs 441*a,c,e* extending from a wing 2 and a second set of lugs 441*b,d* extending from a flap 15.

The U-shaped bushing 90 is particularly applicable in the pin joint assembly 130 shown in FIGS. 7 to 15, however it will be clear that the U-shaped bushing 90 will be suitable to a wide range of pin joint assemblies.

The described examples refer to a first set of lugs comprising three lugs and a second set of lugs comprising two lugs, however it will be clear that the first and second sets may have any number of lugs, including one lug.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A pin joint assembly, comprising:
a first lug having a first bore and a second lug having a second bore;
a pin extending through the first and second bores; and
a U-shaped bushing disposed between the first lug and the pin, wherein the U-shaped bushing comprises a first end flange and a second end flange that extend radially outwards and retain the U-shaped bushing to the first lug, the U-shaped bushing comprising a first bushing component having a first cylindrical body portion and a first flanged portion extending from the first body portion, and a second bushing component having a second cylindrical body portion and a second flanged portion extending from the second body portion;
wherein the first cylindrical body portion is concentrically disposed within the second cylindrical body portion and fastened therewith via an interference fit or friction fit such that the first and the second cylindrical body portions extend through the first bore and wherein the first lug is contained between the first and the second flange portion;
wherein the U-shaped bushing comprises a bearing surface defined by the second cylindrical body portion between the first and second flanged portions on which the first lug is rotatable and slidable in a direction parallel to an axis of the pin;
wherein an axial end surface of the first cylindrical body portion is flush with a radially-extending outer face of the second flange portion of the second bushing component; and
wherein an axial end surface of the second cylindrical body portion abuts a radially-extending inner face of the first flange portion of the first bushing component.

2. The pin joint assembly of claim 1, wherein the pin comprises a head end, a tail end, and a body portion between the head end and tail end, wherein the head end has a diameter greater than a diameter of the body portion.

3. The pin joint assembly of claim 2, wherein the U-shaped bushing is adjacent the head end of the pin.

4. The pin joint assembly of claim 1, wherein the U-shaped bushing bears against the second lug.

5. The pin joint assembly of claim 1, further comprising a first bushing between the second lug and the pin and/or a second bushing between the first lug and the U-shaped bushing.

6. The pin joint assembly of claim 5, wherein the first bushing is a fixed bushing fixedly attached to the second lug and/or the second bushing is a fixed bushing fixedly attached to the first lug.

7. The pin joint assembly of claim 1, wherein the pin comprises a head end, a tail end, and a body portion between the head end and tail end, the head end having a diameter greater than a diameter of the body portion, wherein the U-shaped bushing is adjacent the head end of the pin, and wherein said outer face of the second flanged portion is arranged adjacent the head end of the pin.

8. The pin joint assembly of claim 1, wherein the U-shaped bushing is rotatable with respect to the pin.

9. An aircraft assembly comprising the pin joint assembly of claim 1, a first aircraft component, and a second aircraft component, wherein the first end lug extends from one of the first or second aircraft components and the second lug extends from the other of the first or second aircraft components, such that the first aircraft component is arranged to rotate relative to the second aircraft component about an axis of the pin joint assembly.

10. The aircraft assembly of claim 9, wherein the first aircraft component is a main wing portion of a wing and the second aircraft component is a wing tip device.

11. The aircraft assembly of claim 9, wherein the first aircraft component is a main wing portion of a wing and the second aircraft component is a flight control surface.

12. The aircraft assembly of claim 9, comprising an obstruction arranged at an obstructed end of the pin.

13. The aircraft assembly of claim 12, wherein the obstruction is an actuator for rotating the second aircraft component relative to the first aircraft component.

14. The aircraft assembly of claim 12, wherein the pin comprises a head end, a tail end, and a body portion between the head end and tail end, wherein the head end has a diameter greater than a diameter of the body portion, and the U-shaped bushing is adjacent the head end of the pin, and wherein the head end of the pin is arranged adjacent the obstruction.

15. The aircraft assembly of claim 12, wherein the pin joint assembly is a first pin joint assembly, and further comprising a second pin joint assembly, wherein the obstruction is arranged at the obstructed end of the first pin joint assembly and at an obstructed end of the second pin joint assembly.

16. The aircraft assembly of claim 12, wherein the pin joint assembly is a first pin joint assembly, and further comprising a second pin joint assembly, wherein the obstruction is arranged at the obstructed end of the first pin joint assembly and at an obstructed end of the second pin joint assembly, and
wherein a head end of a pin of the second pin joint assembly is arranged adjacent the obstruction.

17. The aircraft assembly of claim 9, wherein the first aircraft component and/or second aircraft component comprises an outer shell, and wherein a clearance distance between the pin and the outer shell in a direction parallel to an axis of the pin varies along the pin.

* * * * *